United States Patent
Arepalli

(10) Patent No.: US 9,418,702 B1
(45) Date of Patent: Aug. 16, 2016

(54) INTERACTIVE MOVIE TIMELINE AND METHOD FOR INTERACTING WITH A MOVIE TIMELINE

(71) Applicant: Srinivas Arepalli, Dublin, OH (US)

(72) Inventor: Srinivas Arepalli, Dublin, OH (US)

( * ) Notice: Subject to any disclaimer, the term of this patent is extended or adjusted under 35 U.S.C. 154(b) by 12 days.

(21) Appl. No.: 14/682,959

(22) Filed: Apr. 9, 2015

Related U.S. Application Data

(60) Provisional application No. 61/978,327, filed on Apr. 11, 2014.

(51) Int. Cl.
| | |
|---|---|
| *H04N 5/84* | (2006.01) |
| *G11B 27/00* | (2006.01) |
| *G11B 27/036* | (2006.01) |
| *G11B 27/10* | (2006.01) |
| *G11B 27/34* | (2006.01) |
| *H04N 5/775* | (2006.01) |
| *G06F 3/0482* | (2013.01) |
| *G06F 3/0484* | (2013.01) |
| *H04N 21/8541* | (2011.01) |

(52) U.S. Cl.
CPC ............ *G11B 27/002* (2013.01); *G06F 3/0482* (2013.01); *G06F 3/04842* (2013.01); *G11B 27/036* (2013.01); *G11B 27/102* (2013.01); *G11B 27/34* (2013.01); *H04N 5/775* (2013.01); *H04N 21/8541* (2013.01)

(58) Field of Classification Search
CPC ... A63F 13/47; A63F 13/10; A63F 2300/632; H04N 21/8541; H04N 21/8547; H04N 5/775; G11B 27/002; G11B 27/036; G11B 27/102; G11B 27/34; G06F 3/0482; G06F 3/04842
USPC .......................................................... 386/241
See application file for complete search history.

(56) References Cited

U.S. PATENT DOCUMENTS

| | | | | | |
|---|---|---|---|---|---|
| 5,607,356 | A | * | 3/1997 | Schwartz | A63F 13/10 345/473 |
| 5,848,216 | A | * | 12/1998 | Kaneshige | G11B 20/00007 386/290 |
| 5,861,881 | A | * | 1/1999 | Freeman | G06F 17/30044 348/E5.096 |
| 5,923,869 | A | * | 7/1999 | Kashiwagi | G11B 20/10 348/E5.011 |
| 7,809,243 | B2 | * | 10/2010 | Seo | G11B 27/034 386/241 |
| 7,912,338 | B2 | * | 3/2011 | Seo | G11B 27/034 386/246 |
| 8,041,190 | B2 | * | 10/2011 | Candelore | G11B 27/034 386/287 |
| 8,116,615 | B2 | * | 2/2012 | Takashima | G11B 20/10 386/341 |
| 8,631,453 | B2 | * | 1/2014 | Sadja | H04N 21/4307 725/110 |
| 8,666,224 | B2 | * | 3/2014 | Chun | G06F 17/30817 386/239 |
| 8,977,113 | B1 | * | 3/2015 | Rumteen | A63F 13/47 386/341 |
| 9,036,984 | B2 | * | 5/2015 | Kang | G11B 27/034 386/223 |
| 2002/0105535 | A1 | * | 8/2002 | Wallace | G06F 3/0485 715/719 |

(Continued)

*Primary Examiner* — David Harvey
(74) *Attorney, Agent, or Firm* — Williams Intellectual Property; Benjamin F. Williams

(57) ABSTRACT

An interactive movie timeline and method for interacting with a movie timeline that includes play of a video mainstream along a movie timeline, said video mainstream including at least one meta-video prompt tag encoded into the movie timeline wherein read of the meta-video prompt tag effects display of an electable option to a viewer enabling selection between alternate content playable as video streams insertable into the movie timeline between each of a meta-video insert tag and a meta-video end tag encoded into the timeline, whereby alternate content is playable in lieu of the video mainstream in sequence with the movie timeline and a viewer is enabled a customizable viewing experience thereby.

7 Claims, 3 Drawing Sheets

(56) References Cited

U.S. PATENT DOCUMENTS

| | | | | |
|---|---|---|---|---|
| 2003/0046638 A1* | 3/2003 | Thompson | ............ | G11B 27/105 709/231 |
| 2004/0223743 A1* | 11/2004 | Seo | ...................... | G11B 27/105 386/241 |
| 2013/0204919 A1* | 8/2013 | Kitazato | ............ | H04N 21/4325 709/201 |

* cited by examiner

INTERACTIVE MOVIE TIMELINE AND METHOD FOR INTERACTING WITH A MOVIE TIMELINE

CROSS-REFERENCE TO RELATED APPLICATIONS

This nonprovisional application for utility patent claims the benefit of provisional application No. 61/978,327 filed on Apr. 11, 2014

FEDERALLY SPONSORED RESEARCH OR DEVELOPMENT

Not Applicable

INCORPORATION BY REFERENCE OF MATERIAL SUBMITTED ON A COMPACT DISK

Not Applicable

BACKGROUND OF THE INVENTION

Various types of movie timelines are known in the prior art. However, what is needed is a interactive movie timeline that includes display of an electable option for play of alternate content playable as video streams insertable into a video mainstream wherein alternate content is selectably viewable including different actors playing the same role, for example, alternate sequences of action, violence, sexual content, is restricted content, or content engendering different ratings for the same movie, alternate plot developments, endings, soundtracks, and other alternate content viewable as an inserted video stream into a video mainstream, whereby customization of a movie is enabled by a viewer.

FIELD OF THE INVENTION

The present invention relates to a interactive movie timeline, and more particularly, to a interactive movie timeline that includes display of an electable option for play of alternate content playable as video streams insertable into a video mainstream wherein alternate content is selectably viewable, including different actors playing the same role, for example, alternate sequences of action, violence, sexual content, restricted content, or content engendering different ratings for the same movie, alternate plot developments, endings, soundtracks, and other alternate content viewable as an inserted video stream into a video mainstream, whereby customization of a movie is enabled by a viewer.

SUMMARY OF THE INVENTION

The general purpose of the interactive movie timeline and method for interacting with a movie timeline, described subsequently in greater detail, is to provide a interactive movie timeline and method for interacting with a movie timeline which has many novel features that result in a interactive movie timeline which is not anticipated, rendered obvious, suggested, or even implied by prior art, either alone or in combination thereof.

The present invention has been devised to enable a viewer selection between electable options displayable during a video mainstream, wherein said viewer selects a video stream for play of alternate content integrated into a video mainstream whereby a customizable movie experience is enabled.

A meta-video prompt tag is encoded into a video mainstream, said meta-video prompt tag effecting display of an electable option onscreen or upon an associated peripheral device. Selection of an electable option by the viewer enables onscreen play of a particular video stream integrated into the video mainstream between each of a meta-video insert tag and a meta-video end tag, whereby alternate content for a particular scene or sequence is playable for view during a movie.

The alternate content is contemplated to include increased and decreased levels of violence, sexual content, or other restricted or alternate content, relative the mainstream, whereby a different rated version of a particular movie is watchable by a viewer (for example, an R rated version of a PG-13 movie, say, or a G rated version of a PG movie, for example). The alternate content may include different actors playing a single role in a particular cameo, for example, or scene, different music tracks, deleted or additional scenes, alternate scenes, bloopers, different plot lines and developments, and even alternate endings. The alternate content may be produced by a separate party than the party producing the mainstream, whereby alternate content is additional to a mainstream, as desired, for comedic, dramatic, tragic, or other effect or contradistinction, as case may be, for the enjoyment of the viewer.

The present interactive movie timeline is contemplated to provide a system for sharing ratings of movies and alternate content, of particular video mainstreams with a particular selection of alternate content video streams selected therein, whereby viewers are enabled sharing and rating of particular versions of the same movie. Thus has been broadly outlined the more important features of the present interactive movie timeline so that the detailed description thereof that follows may be better understood and in order that the present contribution to the art may be better appreciated.

Objects of the present interactive movie timeline, along with various novel features that characterize the invention are particularly pointed out in the claims forming a part of this disclosure. For better understanding of the interactive movie timeline, its operating advantages and specific objects attained by its uses, refer to the accompanying drawings and description.

BRIEF DESCRIPTION OF THE DRAWINGS

Figures

DETAILED DESCRIPTION OF THE DRAWINGS

Figure 1:
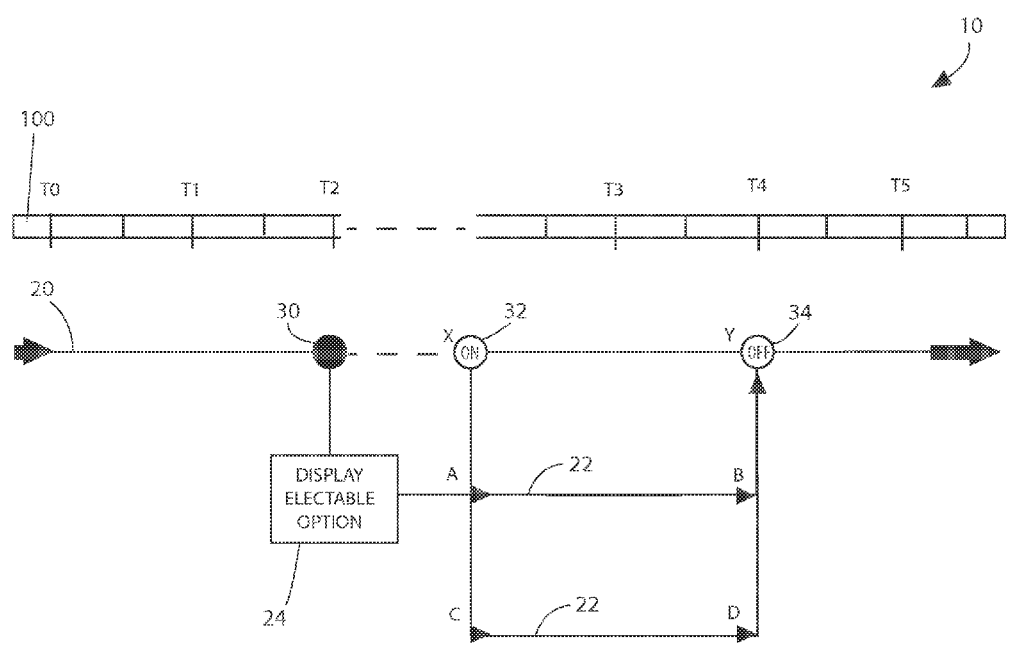
FIG. 1 is a diagrammatic view of an example embodiment illustrating alternate content as a playable video stream insertable into a movie timeline between a meta-video insert tag and a meta-video end tag.
Figure 2:
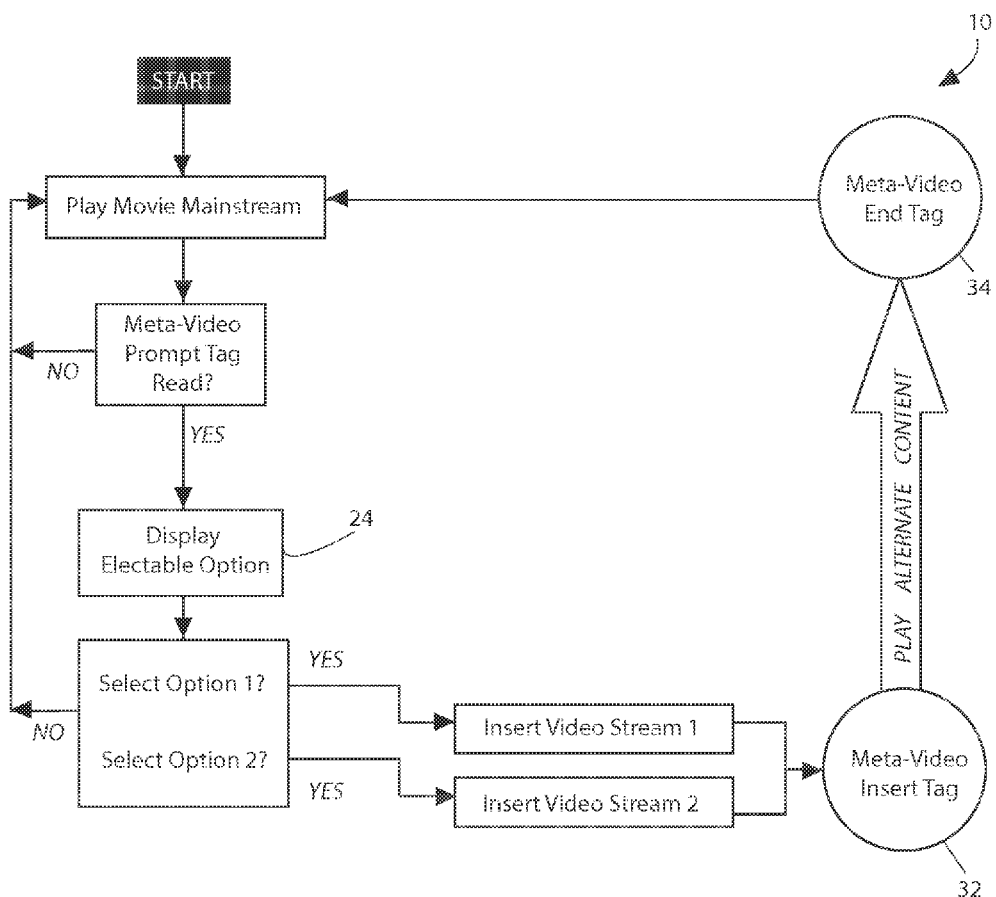
FIG. 2 is a diagrammatic view of an example embodiment of a flow chart illustrating selection of an electable option whereby alternate content is playable as a video stream insertable into a movie timeline between a meta-video insert tag and a meta-video end tag.
Figure 3:
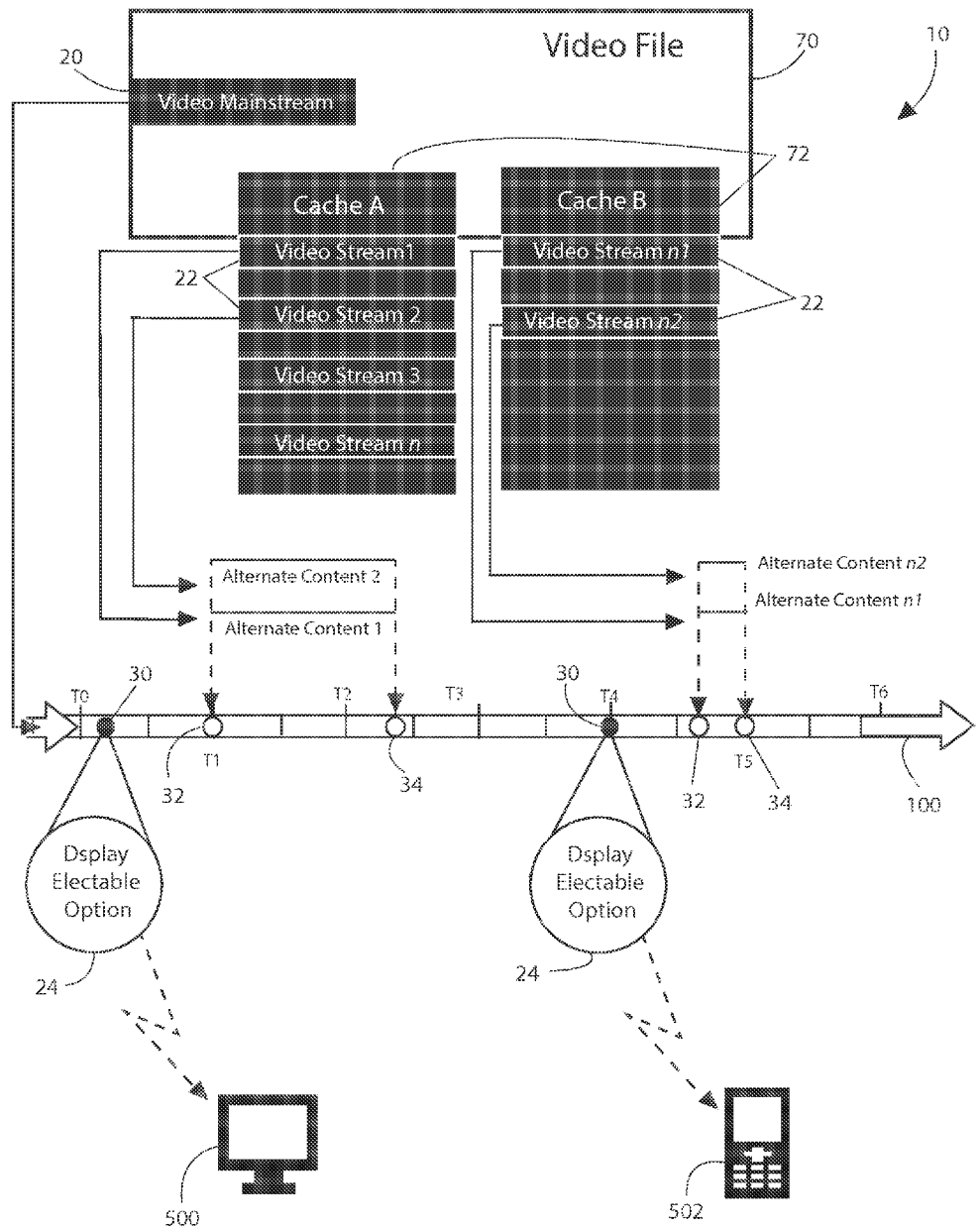
FIG. 3 is a diagrammatic view of an example embodiment illustrating access and play of a video stream from caches storable in memory as part of a video file, said video stream playable inserted into a movie timeline in lieu of a video mainstream between a meta-video insert tag and a meta-video end tag encoded into the timeline.

With reference now to the drawings, and in particular FIGS. 1 through 3 thereof, example of the instant interactive movie timeline employing the principles and concepts of the present interactive movie timeline and generally designated by the reference number 10 will be described.

Referring to FIGS. 1 through 3 an example embodiment of the interactive movie timeline 10 is illustrated.

The present interactive movie timeline 10 has been devised to enable interactive selection between multiple video streams 22 insertable in sequence to a video mainstream 20 whereby a viewer is enabled to select between alternate content for display along a movie timeline 100. For example, a viewer may be prompted at a particular point in a movie timeline 100 with a choice of alternate content selectable to fill a particular cameo role in a particular scene, for example, wherein different actors play the role in each alternate content. Alternate content may include alternate soundtracks, sounds effects, insertion of deleted or additional scenes, bloopers, increased or decreased levels of explicit content, among other examples, effecting dramatic or comedic effect selectable by a viewer, as desired.

A viewer is thus enabled multiple viewing experiences for a single movie, and may select between alternate content to customize a preferred or optional version of the movie. Additional alternate content is contemplated as part of this invention 10, including, for example, alternate endings, increased and decreased levels of violence or action sequences, for example, increased or decreased levels of sexual content, for example, different soundtracks, sound effects, and music tracks, as well as inclusion of deleted scenes and bloopers, viewable optionally effective by selection of a viewer. The alternate content further includes optional inclusion of relevant (and irrelevant) facts, statements, or other graphical displays pertaining to the movie, actors, or other data, as well as questions and answers possible onscreen during particular scenes in the video mainstream 20. Particular answers to particular questions may alter the content displayed as part of the video mainstream 20.

The motivation is to provide a movie timeline 100 selectable between various alternate content whereby a customizable movie experience is enabled and comedic, dramatic, tragic, or other effects, are appositional into a particular scene or plot development, as selectable by a viewer.

To accomplish this, a method is contemplated wherein a meta-video prompt tag 30 is inserted into a video mainstream 20 whereby selection of alternate content is enabled. The meta-video prompt tag 30 is readable by a media player 500 and electable options 24 for alternate content are thence displayable onscreen (or on an associated peripheral device 502) for selection by a viewer. The display of electable options 24 may occur concurrent with the video mainstream 20 (that is, the video mainstream 20 may remain uninterrupted) or the video mainstream 20 may pause until selection of the electable option 24 is input. Selection of any one of a plurality of electable options 24 loads the alternate content for display as a video stream 22 integrated as part of the video mainstream 20 at a meta-video insert tag 32. A meta-video end tag 34 subsequently reverts the video stream 22 back to the video mainstream 20 whereby the movie timeline 100 is maintained.

Thus a movie timeline 100 includes a video mainstream 20. The term "mainstream", as used herein throughout, is taken to include a video stream of an originally produced and finalized movie. Alternate content is available for display integrated into the video mainstream 20 as video streams 22 of alternate content at particular identifiable frames in the mainstream 20. A meta-video prompt tag 30, included with a particular frame in the mainstream 20, alerts a viewer of selectable alternate content by display of an electable option 24. The electable option 24 may be displayed onscreen or upon a peripheral device used in association with a media player 500. Selection of an electable option 24 by the viewer thence effects play of a video stream 22 having alternate content inserted between a meta-video insert tag 32 and a meta-video end tag 34 concurrent with the movie timeline 100. Failure to select an electable option 24 may maintain play of the mainstream 20 along the movie timeline 100, or default play to alternate content preselected at an intro menu presented previous to starting the video mainstream 20.

Alternate content, playable as a video stream 22 run between a meta-video insert tag 32 and a meta-video end tag 34 concurrent with the movie timeline 100, is contemplated to include alternate scenes having increased or decreased levels of violence relative the mainstream; sexual, explicit, or restricted content; content appropriate for different ages and ratings of the same movie (such as, for example, an R-rated version of a PG-13 movie mainstream); content having different actors playing the same role; alternate content produced by different parties than the producers of the mainstream; inclusion of deleted and additional scenes; bloopers; optional endings or plot developments; humorous interjections; alternate soundtracks or sound effects; graphical displays; relevant or irrelevant facts; among other video streams 22 contemplated for inclusion as an electable option 24 displayable for selection by a viewer able thereby to control enjoyment of a particular movie along a movie timeline 100.

Referring now to FIG. 1, movie timeline 100 is illustrated with runtimes T0 to T5. T0 to T5 are generally taken to include any time markers affecting a movie timeline. Video mainstream 20 is played current from T0 to T2 wherein meta-video prompt tag 30, encoded into the movie timeline 100 at time T2 elicits display of an electable option 24 for selection by a viewer. The video mainstream 20 may pause, or remain playing, depending on data encoded in the meta-video prompt tag 30. Selection of an electable option 24 inserts video stream 22 with content AB, or alternately video stream 22 with alternate content CD, between meta-video insert tag 32 and meta-video end tag 34, as illustrated in FIG. 1, said video stream 22 playable in lieu of video mainstream 20 content XY along movie timeline sequence T2 to T4. Video mainstream renews play at T4 subsequent read of meta-video end tag 34.

As shown in FIG. 3, an example embodiment of the present interactive movie timeline and method for interacting with a movie timeline 10, includes storing a video file 70 to memory as a video mainstream 20. Alternate content is also written to memory as at least one video stream 22 playable concurrent the movie timeline 100 in lieu of the video mainstream 20. Video streams 22 may be storable in specific caches or directories 72 packaged as part of an individual video file 70, and identifiable for access by a media player 500 when a viewer effects selection of an electable option 24.

At least one meta-video prompt tag 30 is encoded in the video mainstream 20. The meta-video prompt tag 30 is readable in sequence by a media player 500 to effect display of at least one electable option 24. The electable option 24 may be displayed onscreen of the media player 500 where the video file 70 is playing or, alternately, upon a peripheral device 502 used in conjunction with the media player 500 running the video file 70.

Subsequent selection of at least one electable option 24 by a viewer, a video stream 22 having alternate content is run playable inserted into the movie timeline 100 in sequence marked by a meta-video insert tag 32 encoded into the movie timeline 100. The video stream 22 is run and alternate content played until a meta-video end tag 34, encoded into the movie timeline 100, is reached in the movie timeline 100 whereby the video mainstream 20 is renewed and the movie timeline 100 uninterrupted.

Depending on the prompt tag 30 read by the media player 500, the video mainstream 20 may be paused until a selection is made, or the prompt tag 30 may occur in the movie timeline 100 previous to the meta-video insert tag 32 a desired interval, whereby movie play is uninterrupted. Failure to select an electable option 24 may then result in the video mainstream 20 playing by default, or, alternately, default play may be set to play particular alternate content settable by selection previous to play of the movie at an intro menu.

Certain electable options 24 may require a password to unlock particular alternate content. Alternatively, selection of an electable option 24 may include answers to particular questions or problems, or speed responses, whereby access to alternate content is thence enabled. Selection of an electable option 24 is contemplated as effective through a peripheral device 502, when used concurrent display of a movie on a media player 500, and multiple peripheral devices 502 may be used to interact with a single movie. A first entered, or first entered correct, response may control play and selection of alternate content when more than one peripheral device is in use with a media player 500 running an interactive movie timeline 10.

Thus alternate content is playable inserted at desired sequences in a movie timeline 100 and at least one viewer is enabled selection of a customizable viewing experience.

What is claimed is:

1. An interactive movie timeline and method for interacting with a movie timeline comprising the steps of:
   encoding at least one meta-video prompt tag, at least one meta-video insert tag, and at least one meta-video end tag, into a timeline of a video mainstream;
   effecting display of at least one electable option when the meta-video prompt tag is read, said electable option routing video play to an associated video stream providing alternate content;
   playing the elected video stream when an associated electable option is selected, said video stream inserted into the movie timeline between the meta-video insert tag and the meta-video end tag; and
   reverting play back to the video mainstream when the meta-video end tag is read;
   wherein at least one video stream having alternate content is playable in lieu of a corresponding at least one scene of the video mainstream, said at least one video stream maintained in sequence against a timeline of the movie, whereby alternate content is selectably playable and a movie timeline thereby customizable between electable options interactively selectable by a viewer.

2. An interactive movie timeline and method for interacting with a movie timeline comprising the steps of:
   storing a video file to memory as a video mainstream;
   storing alternate content to memory as at least one video stream;
   encoding at least one meta-video prompt tag in the video mainstream, said meta-video prompt tag readable in sequence by a media player;
   encoding at least one meta-video insert tag in the video mainstream, said meta-video insert tag readable in sequence by a media player;
   encoding at least one meta-video end tag in the video mainstream, said meta-video end tag readable in sequence in the movie timeline subsequent read of the at least one meta-video insert tag, said meta-video end tag readable by a media player;
   effecting display of at least one electable option onscreen when each at least one meta-video prompt tag is read, said electable option including a selectable menu wherein a viewer may select a video stream of alternate content;
   effecting play of alternate content when a video stream is selected from the at least one electable option, said alternate content playable in lieu of the video mainstream and inserted at the meta-video insert tag and playable up to the meta-video end tag readable in the movie timeline; and
   reverting play to the video mainstream when the at least one meta-video end tag is read;
   wherein alternate content is playable at desired sequences in a movie timeline, whereby a viewer is enabled to select a customizable viewing experience.

3. The interactive movie timeline and method for interacting with a movie timeline of claim 2 wherein each at least one electable option is displayable upon at least one peripheral device used in association with the media player.

4. The interactive movie timeline and method for interacting with a movie timeline of claim 3 wherein at least one of the at least one electable option is password protectable.

5. The interactive timeline and method of interacting with a movie timeline of claim 3 wherein a correct response is selectable in order to run the alternate content.

6. The interactive timeline and method of interacting with a movie timeline of claim 3 wherein a first selection of an electable option effected upon a peripheral device, when more than one peripheral device is displaying the electable option, controls selection and display of the alternate content.

7. The interactive timeline and method of interacting with a movie timeline of claim 3 wherein a first correct selection of an electable option effected upon a peripheral device, when more than one peripheral device is displaying said electable option, controls selection and display of the alternate content.

* * * * *